US012511173B2

(12) United States Patent
Saito et al.

(10) Patent No.: US 12,511,173 B2
(45) Date of Patent: Dec. 30, 2025

(54) CLOUD-BASED FRAMEWORK FOR ANALYSIS USING ACCELERATORS

(71) Applicant: Luminary Cloud, Inc., Redwood City, CA (US)

(72) Inventors: Yasushi Saito, Mountain View, CA (US); Thomas D. Economon, San Francisco, CA (US); Michael Thomas Mara, La Jolla, CA (US); Jason Ansel Lango, San Carlos, CA (US); Juan José Alonso, Stanford, CA (US)

(73) Assignee: Luminary Cloud, Inc., San Mateo, CA (US)

( * ) Notice: Subject to any disclaimer, the term of this patent is extended or adjusted under 35 U.S.C. 154(b) by 586 days.

(21) Appl. No.: 17/843,457

(22) Filed: Jun. 17, 2022

(65) Prior Publication Data
US 2024/0095090 A1    Mar. 21, 2024

(51) Int. Cl.
*G06F 9/50*    (2006.01)
(52) U.S. Cl.
CPC .......... *G06F 9/5077* (2013.01); *G06F 9/5072* (2013.01); *G06F 2209/5011* (2013.01)
(58) Field of Classification Search
CPC ................. G06F 9/5077; G06F 9/5072; G06F 2209/5011
See application file for complete search history.

(56) References Cited

U.S. PATENT DOCUMENTS

| 2004/0143664 | A1* | 7/2004 | Usa | G06F 9/5077 709/226 |
| 2011/0202745 | A1* | 8/2011 | Bordawekar | G06T 1/20 712/30 |

(Continued)

FOREIGN PATENT DOCUMENTS

WO    WO-2020198724 A1    10/2020

OTHER PUBLICATIONS

Grama A et al. "Introduction to Parallel Computing, Principles of Parallel Algorithm Design" Jan. 1, 2003, p. 86 through 95, 38 pages.

(Continued)

*Primary Examiner* — Wissam Rashid
(74) *Attorney, Agent, or Firm* — Cesari and McKenna, LLP (57) ABSTRACT

A cloud-based framework dynamically utilizes a distributed pool of accelerators to parallelize calculations of physical simulation (physics) solver code partitioned across multiple accelerators and compute nodes of one or more virtual data centers in a virtualized computing environment. Multi-level partitioning logic of the framework partitions an input data set of the physics solver code into code groups configured to run on the accelerators using a "hardware agnostic" software layer that abstracts differences in processing architectures to allow targeting of different types of accelerators. A predictive scheduler interacts with the multi-level partitioning logic to locate and predictively reserve the accelerators within the pool, dynamically access and utilize the accelerators when needed, and then promptly release them upon completion of the calculations. The framework is configured (Continued)

to efficiently use bandwidth/compute capacity of the accelerators for physics solver code calculations asynchronously and in cooperation with general-purpose processing units as needed and on user demand.

20 Claims, 7 Drawing Sheets

(56) References Cited

U.S. PATENT DOCUMENTS

2020/0183738 A1\* 6/2020 Champigny .......... G06F 9/5016
2021/0081347 A1\* 3/2021 Liao ...................... G06F 9/5066

OTHER PUBLICATIONS

PCT Notification of Transmittal of the International Search Report and the Written Opinion of the International Searching Authority, or the Declaration, International Searching Authority, International Application No. PCT/US2023/025140, mailed Sep. 25, 2023, 16 pages.

\* cited by examiner

CLOUD-BASED FRAMEWORK FOR ANALYSIS USING ACCELERATORS

BACKGROUND

Technical Field

The present disclosure relates to virtualized computing environments and, more specifically, to a cloud-based framework configured to enable physics-based analysis and design/development using accelerators in a virtualized computing environment.

Background Information

Many enterprises utilize virtual machines (VMs) running on compute nodes provided by a cloud-based, virtual data center (VDC) of a virtualized computing environment. The VDC may furnish resources, such as storage, memory, networking, and/or processor resources that are virtualized by virtualization software, e.g., a hypervisor, and accessible over a computer network, such as the Internet. Each VM may include a guest operating system and associated applications configured to utilize the virtualized resources of the VDC. An example of applications that may run in a VM and utilize the virtualized resources of the VDC is physical simulation software in the area of computer aided engineering (CAE).

Typically, the physical simulation software of legacy CAE software vendors is architected to run on on-premises computing clusters having general-purpose processor resources, such as central processing units (CPUs), connected through a high-performance network. However, recent developments by these legacy software vendors move select portions (e.g., linear solver code) of the physical simulation software for execution (running) on specialized hardware accelerator resources, such graphics processing units (GPUs), with the remaining portions of the physical simulation still being run on CPUs. Such limited apportionment is all that can be achieved because the legacy simulation software was originally developed to run on CPUs and the effort/cost to re-write (re-architect) the entire software for execution on GPUs is substantial, particularly considering the vectorization and parallelization of specific routines (simulation kernels) within the simulation software that benefit when run on the GPUs. The best ways to use the memory hierarchy on GPUs (and the available memory bandwidth) are also different than the ways in which CPU code utilizes the memory/memory bandwidth. Further, the limited apportionment results in substantial communication (e.g., data transfer) overhead between CPU and GPU, thereby impacting any performance improvements.

In addition, fundamental numerical algorithms and/or methods that work best for CPU computing may not necessarily be the best for GPU computing. For example, specific solvers, reordering techniques, etc. may need to be chosen and implemented for maximum performance on GPUs. Proper and effective timing of execution of various parts of an algorithm (executing on GPU) is also significant; without it, GPU resources may be squandered to the extent that the code running on GPU is not substantially more performant than the same code running on CPU. Mixed-precision arithmetic can also be exploited in GPUs much more effectively than in CPUs, e.g., because of higher single- or half-precision floating-point performance together with commensurate decrease in bandwidth requirements.

Moreover, complications may arise for the legacy CAE vendors developing cloud-native software to run on GPUs since their entire approach has been developed for on-premises software and, as a result, transition to the cloud-native software approach must consider, inter alia, remote visualization, remote data analysis and/or knowledge extraction, transfer of data between a cloud service provider (CSP) and a user, managing large volumes of data and data science. Also, leasing desirable computational resources from CSPs, such as on-demand GPU allocation, may be difficult because those resources tend to be limited and difficult to acquire and utilize in a cost-effective manner.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a cloud-based framework having an architecture configured to dynamically utilize a distributed pool of specialized processing resources (i.e., accelerators) to speed-up, as well as parallelize (further speed-up), processing (e.g., calculations) of physical simulation software (e.g., computational fluid dynamics solver code or, more generally, physics solver code) partitioned across multiple accelerators and, often, across multiple compute nodes of one or more virtual data centers in a virtualized computing environment. To that end, multi-level partitioning logic of the framework may partition an input data set (e.g., a mesh) of the physics solver code into code groups (e.g., simulation kernels operating on one or more partitions) configured to run on the accelerators using a "hardware agnostic" software layer (e.g., an application programming interface) that abstracts differences in processing architectures to allow targeting of different types of accelerators from a same code base. The framework architecture is configured to efficiently use bandwidth/compute capacity of the accelerators for physics solver code calculations asynchronously and in cooperation with general-purpose processing units as needed and on user demand. The framework is further configured to cost-effectively (i.e., efficiently) obtain, use and release resources from one or more distributed pools of resources provided by a virtual data center (VDC), such as a cloud service provider, to essentially furnish those resources on-demand for the simulation, while avoiding idling of those resources from poor prospective management of expected demand.

In an embodiment, the framework includes a predictive scheduler that interacts with the multi-level partitioning logic to locate and predictively reserve resources, including compute, memory and storage resources, within the VDC that are available in their respective distributed pools, dynamically access and utilize those resources from the pools when needed, and then promptly release the resources upon completion of the calculations when anticipated demand falls. For instance, the predictive scheduler may locate compute resources, such as accelerators, before they are needed within an expected window of time, measure the distances (i.e., latency) of the accelerators (e.g., on which the software executes) relative to each other, dynamically access and utilize available accelerators for kernel execution (e.g., based on the measured distances), and then promptly release the accelerators, if necessary, upon completion of the execution. The kernels may run on the accelerator and other VDC resources spanning multiple compute nodes within the virtualized computing environment that require management of complexities such as, e.g., partial failure, non-uniform communication latencies and/or non-uniform hardware mixes. The scheduler may further cooperate with the hardware agnostic software layer of the framework to address such complexities through (i) multi-region (i.e., diverse geographic) deployment of various VDC resources, (ii) error correction and backup for the parallelized physics solver code calculations, and (iii) resulting simulation data storage and visualization, which is desirable to be constrained near a user location to reduce latency.

For example, the framework architecture is configured to persistently and asynchronously store results from the physical simulation that involve substantial amounts of data (e.g., organized as data sets) output from the physics solver code calculations, and provide subsequent retrieval and display of those data sets for visualization via a user interface, e.g., a graphical user interface. The VDC resources employed for compute, storage and visualization of the simulation results are scalable (and are acquired, used, and released efficiently) to satisfy resource constraints associated with backing-up data in locations far from users, as well as visualization of very large and possibly transient data sets, e.g., at a location close to the users. Users of the framework may thus visualize arbitrarily large simulations without concern about exhausting memory and/or compute capacity, as is often the case with on-premises rendering. The data sets may be persistently stored and organized as a query-able database that is, e.g., presented as an analyzer configured to provide "instant analysis" using text-based queries of a calculated physical simulation result. The database may be hosted at a cloud file service, which obviates the need to transfer the data sets from a compute node of the VDC that stores the database to another compute node that performs the visualization, thereby saving substantial time and effort associated with resource type or capacity management.

Advantageously, the framework architecture enables supercomputing-class performance using scaled cloud-based computational resources by optimizing acquisition and utilization of various cloud-based VDCs, e.g., accelerator resources required to process the physical simulation software on-demand as an efficient cost-effective service based on usage. Such performance is achieved by partitioning the physical simulation software into simulation kernels operating on partitions for parallelized and concurrent execution across and/or within the accelerators, as well as providing efficient vectorized algorithms and data structures for the kernels to optimize performance on each accelerator. In addition, the scheduler and hardware agnostic software layer cooperate to provide VDC resources for location-dependent data storage and visualization to improve non-uniform communication latencies and/or mixed hardware deployment. As a result, the asynchronous framework architecture provides significant improvement (e.g., 100×) in speed of execution over traditional simulation approaches of legacy vendors executing on conventional multi-processor workstation environments, while effectively managing costs for customers/users of a CAE Software as a Service (SaaS) offering, thereby resulting in a substantial competitive advantage.

DESCRIPTION

Figure 1:
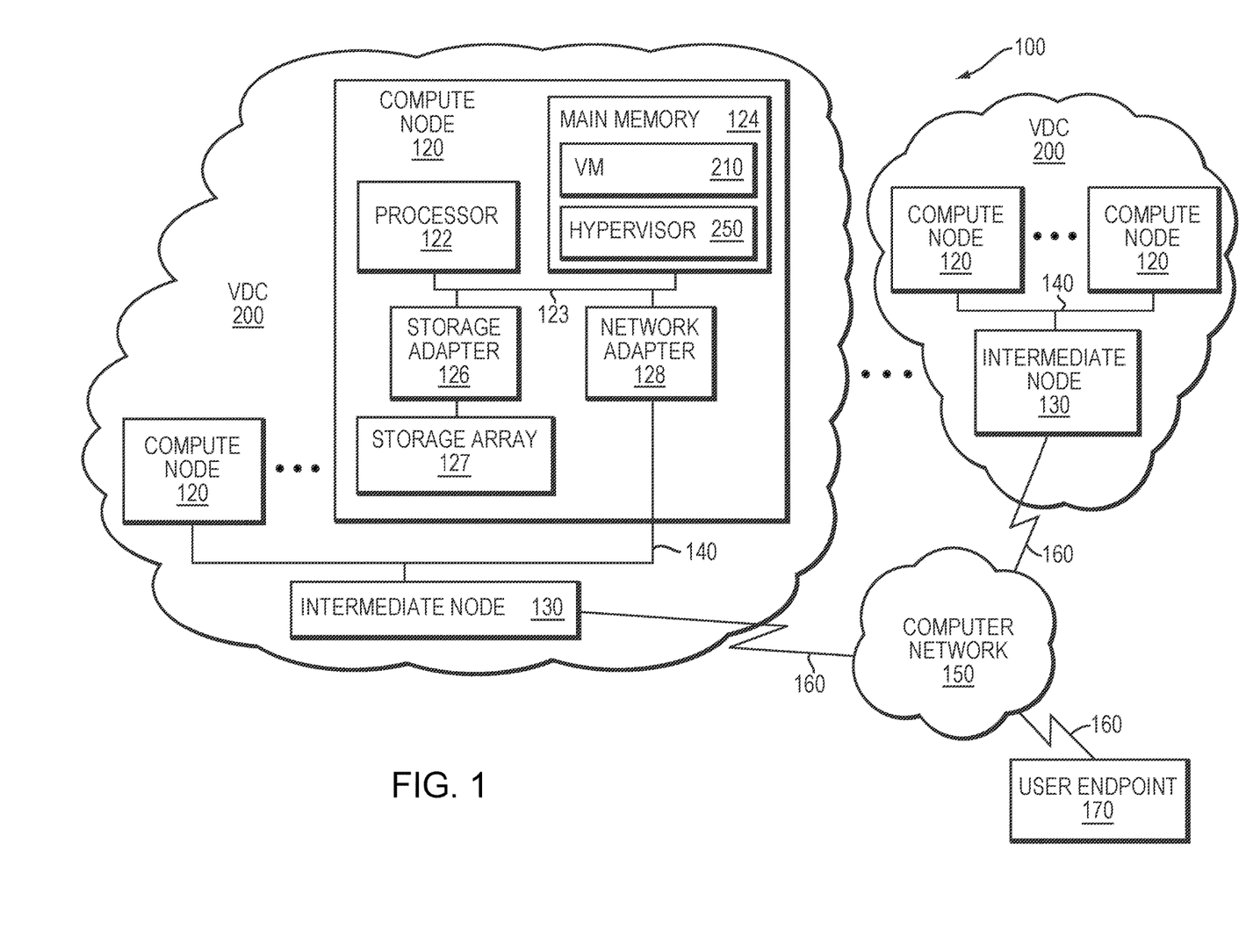
FIG. 1 is a schematic block diagram of a virtualized computing environment.

FIG. 1 is a schematic block diagram of a virtualized computing environment 100 that may be advantageously used with the cloud-based framework disclosed herein. The virtualized computing environment includes one or more virtual data centers (VDCs 200) configured to provide virtualization that transforms physical hardware of the environment into virtual resources, as well as cloud computing that enables on-demand access to the virtualized resources, e.g., over a computer network. In an illustrative embodiment, the architecture of the cloud-based framework extends the virtualization and cloud-computing capabilities of the VDCs 200 to provide improved execution of workloads, such as computer aided engineering (CAE) physical simulation software (e.g., physics solver code), as a cloud-based service offering, such as Software as a Service (SaaS), to users in a highly available, reliable, and cost-effective manner.

In an embodiment, the virtualized computing environment 100 includes one or more compute nodes 120 and intermediate nodes 130 illustratively embodied as one or more VDCs 200 interconnected by a computer network 150. The VDCs 200 may be cloud service providers (CSPs) deployed as private clouds or public clouds, such as deployments from Amazon Web Services (AWS), Google Compute Engine (GCE) of the Google Compute Project (GCP) ecosystem, Microsoft Azure, or VMWare. Each VDC 200 may be configured to provide virtualized resources, such as virtual storage, networking, memory, and/or processor resources that are accessible over the computer network 150, such as the Internet, to users at one or more user endpoints 170. Each compute node 120 is illustratively embodied as a computer system having one or more processors 122, a main memory 124, one or more storage adapters 126, and one or more network adapters 128 coupled by a network segment 123, such as a system interconnect. The storage adapter 126 may be configured to access information stored on magnetic/solid state storage devices, e.g., hard disk drives (HDDs), solid state drives (SDDs) or other similar media, of storage array 127. To that end, the storage adapter 126 may include input/output (I/O) interface circuitry that couples to the storage devices over an I/O interconnect arrangement, such as a conventional peripheral component interconnect (PCI), serial ATA (SATA), or non-volatile memory express (NVMe) topology.

The network adapter 128 connects the compute node 120 to other compute nodes 120 of the VDC 200 over local network segments 140 illustratively embodied as shared local area networks (LANs) or virtual LANs (VLANs). The network adapter 128 may thus be embodied as a network interface card (NIC) having the mechanical, electrical and signaling circuitry needed to connect the compute node 120 to the local network segments 140. The intermediate node 130 may be embodied as a network switch, router, or virtual private network (VPN) gateway that interconnects the LAN/VLAN local segments with remote network segments 160 illustratively embodied as point-to-point links, wide area networks (WANs), and/or VPNs implemented over a public network (such as the Internet). The VDC may utilize many different, heterogeneous network segments 123, 140, 160 for intra-node, inter-node, and inter-VDC communication, respectively, wherein the heterogeneous networks are diverse in characteristics such as bandwidth and latency. Communication over the network segments 140, 160 may be affected by exchanging discrete frames or packets of data according to pre-defined protocols, such as the Transmission Control Protocol/Internet Protocol (TCP/IP) and the OpenID Connect (OIDC) protocol, although other protocols, such as the User Datagram Protocol (UDP), the NVIDIA Collective Communications Library (NCCL), Infiniband, or the Hyper-Text Transfer Protocol Secure (HTTPS) may also be advantageously employed.

The main memory 124 includes a plurality of memory locations addressable by the processor 122 and/or adapters for storing software code (e.g., processes and/or services) and data structures associated with the embodiments described herein. The processor and adapters may, in turn, include processing elements and/or circuitry configured to execute the software code, such as a virtual machine (VM) 210 and a hypervisor 250, and manipulate the data structures. The processors 122 may include general-purpose hardware processor resources, such as central processing units (CPUs) as well as specialized hardware accelerator resources, such as tensor processing units (TPUs) or, in an illustrative embodiment, graphics processing units (GPUs).

It will be apparent to those skilled in the art that other types of processing elements and memory, including various computer-readable media, may be used to store and execute program instructions pertaining to the embodiments described herein. Also, while the embodiments herein are described in terms of software code, processes, and computer, e.g., application, programs stored in memory, alternative embodiments also include the code, processes and programs being embodied as logic, components, and/or modules consisting of hardware, software, firmware, or combinations thereof.

Figure 2:
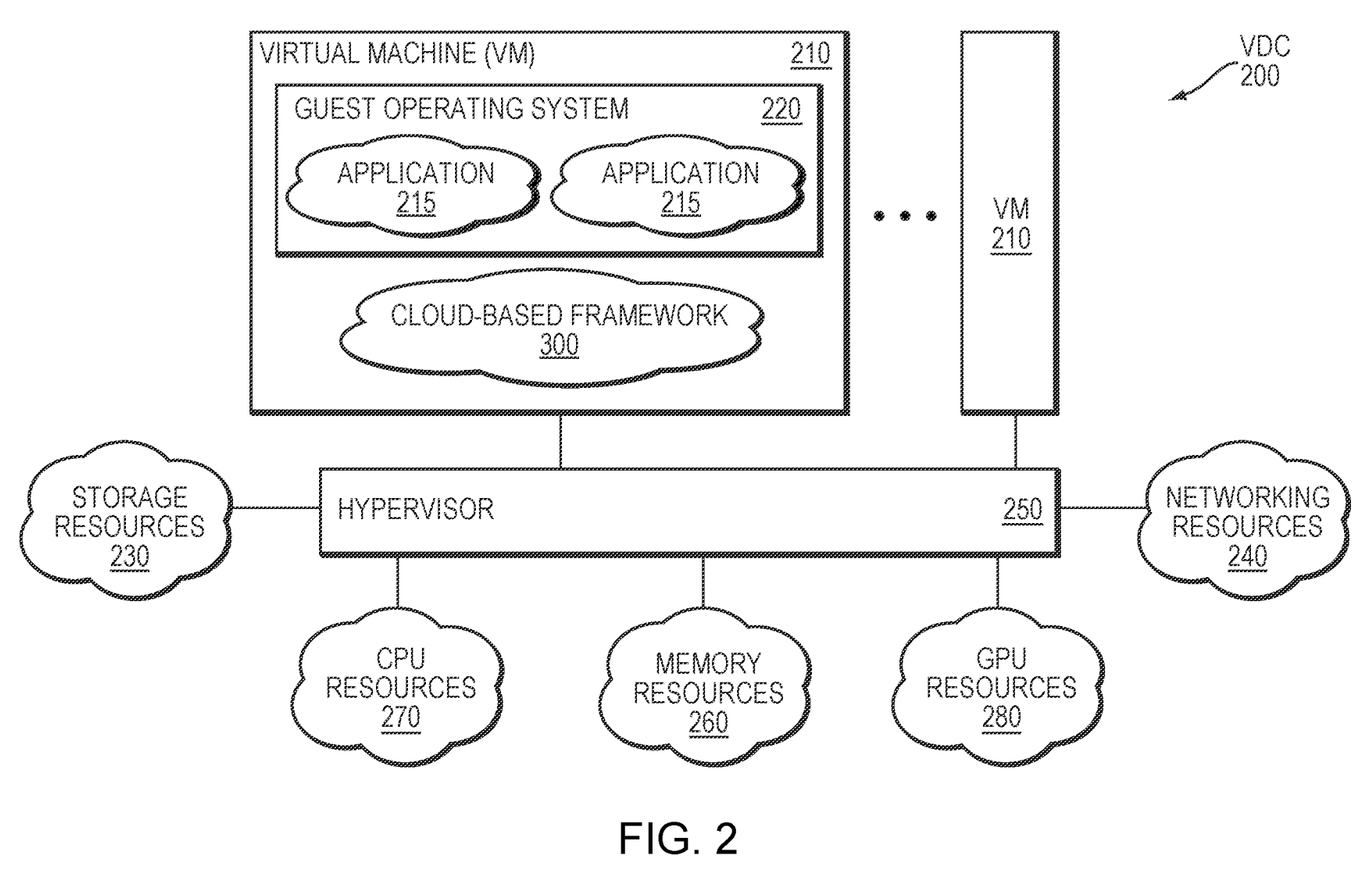
FIG. 2 is a schematic block diagram of a virtual data center.

FIG. 2 is a schematic block diagram of a virtual data center (VDC) 200 including one or more virtual machines (VMs) 210. Each VM 210 is managed by a hardware abstraction layer, e.g., a hypervisor 250, which is a virtualization platform configured to mask low-level hardware operations from one or more guest operating systems executing in the VM 210. In an embodiment, the hypervisor 250 is illustratively the Xen hypervisor, although other types of hypervisors, such as the Hyper-V hypervisor and/or VMware ESXI hypervisor, may be used in accordance with the embodiments described herein. A guest operating system (OS) 220 and applications 215, such as physical simulation software (e.g., physics solver code), may run in the VM 210 and may be configured to utilize hardware resources of the VDC 200 that are virtualized by the hypervisor 250. The guest OS 220 may be the Linux operating system, FreeBSD and similar operating systems; however, it should be noted that other types of guest OSs, such as the Microsoft Windows operating system, may be used in accordance with the embodiments described herein. The guest OS 220 and applications 215 may be managed, at least in part, by a cloud-based framework 300 configured to extend the virtualization and cloud-computing capabilities of VDC 200, including the utilization of virtualized resources.

As noted, the virtualized resources of the virtualized computing environment include storage, networking, memory, and/or processor resources. In an embodiment, the VDC 200 may organize the resources as pools of virtualized resources. For example, the VDC 200 may organize the virtualized resources as pools of virtualized storage (e.g., HDD and/or SSD) resources 230, networking (e.g., NIC) resources 240, memory (e.g., random access memory) resources 260, and processor resources, such as pools of general-purpose processing resources and specialized processing resources. The pool of general-purpose processing resources may be embodied as a pool of CPUs 270 and the pool of specialized processing resources may be embodied as accelerators, such as TPUs or, illustratively, a pool of GPUs 280. These pools of resources may be organized and distributed among the compute nodes 120 of the VDC 200.

Figure 3:
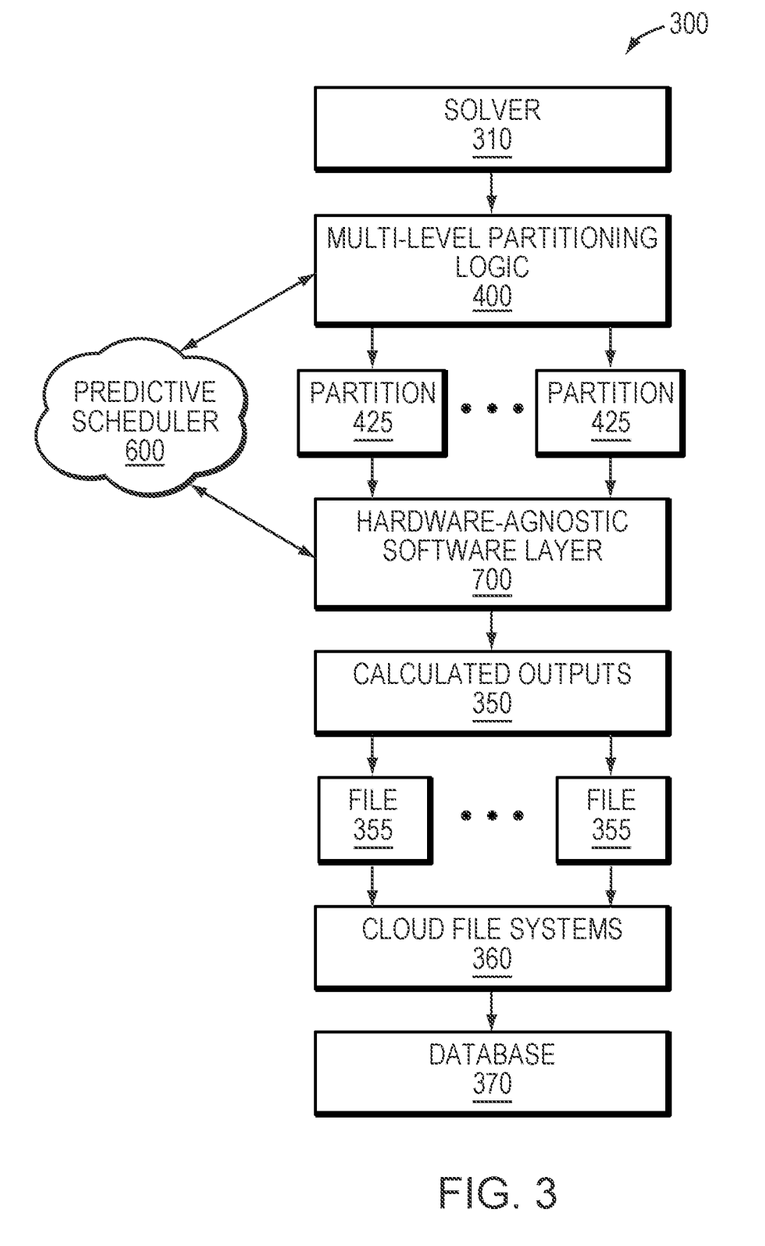
FIG. 3 is a schematic block diagram of a cloud-based framework.

The embodiments described herein are directed to a cloud-based framework having an architecture configured to dynamically utilize the distributed pool of specialized processing resources (i.e., accelerators) to speed-up, as well as parallelize (further speed-up), processing (e.g., calculations) of physical simulation software (e.g., computational fluid dynamics solver code or, more generally, physics solver code) partitioned across multiple accelerators (e.g., GPUs). FIG. 3 is a schematic block diagram of the cloud-based framework 300. An input data set (e.g., a mesh) of the physics solver code (solver 310) may be partitioned, e.g., via multi-level partitioning logic 400 of the cloud-based framework 300, into simulation kernels having one or more partitions 425 (i.e., code groups) that are configured to run on the GPUs 280. A predictive scheduler 600 interacts with the multi-level partitioning logic 400 to locate, reserve, dynamically access, and thereafter release the GPUs needed for running the simulation kernels. The framework 300 is configured to efficiently use bandwidth/compute capacity of the GPUs 280 for solver calculated outputs 350 asynchronously (via a hardware agnostic layer 700) and in cooperation with CPUs 270 as needed and on user demand. The results from the solver calculated outputs 350 are written as files 355 to cloud file systems 360. The files may include substantial amounts of data, which may be indexed and organized as output data sets that are, in turn, persistently and asynchronously stored as a query-able database 370. Illustratively, the database 370 may be presented as an analyzer configured to provide "instant analysis" using text-based queries of a calculated physical simulation result.

Multi-Level Partitioning of Solver

Figure 4:
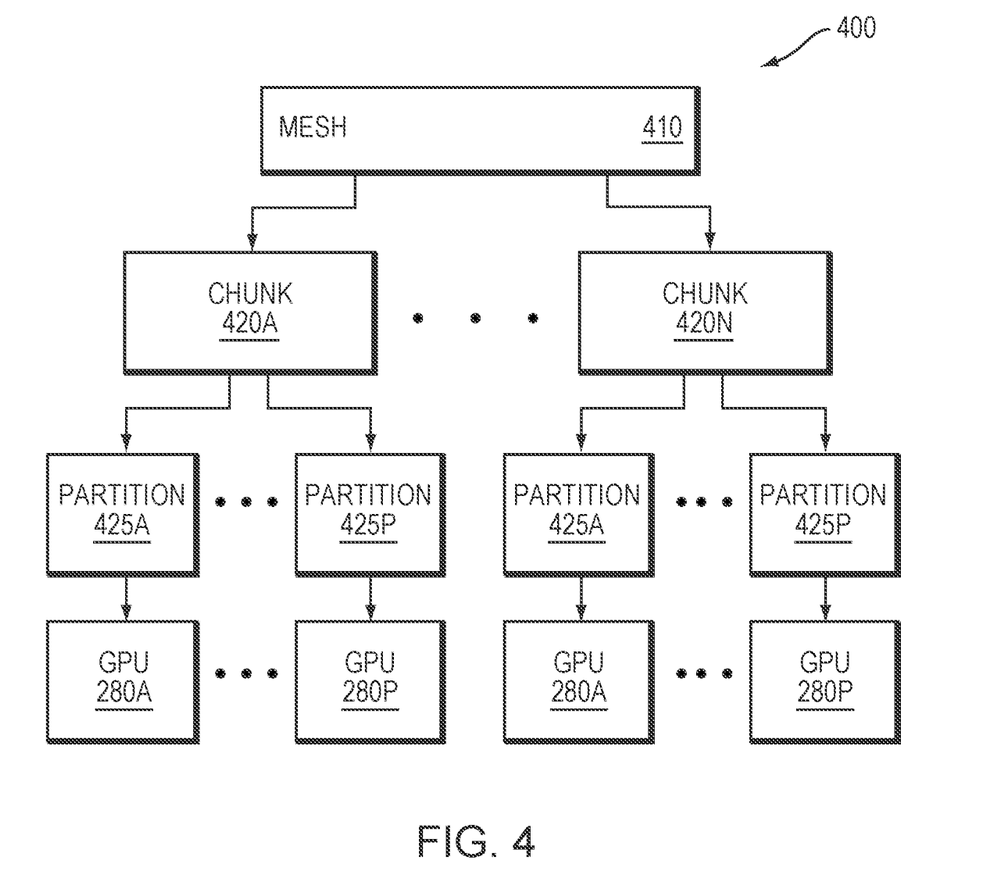
FIG. 4 is a schematic block diagram of multi-partitioning logic of the cloud-based framework.

As used herein, simulation kernels are compute-intensive portions of the solver 310 that perform some operation(s) on a partition of an input data set (e.g., a mesh or a portion of a mesh). In the solver 310, the mesh is partitioned into partitions 425 for parallelized execution across the GPUs 280 using multi-level partitioning (e.g., multi-level domain decomposition) logic 400 of the framework 300. To that end, the solver 310 is developed with a hierarchy of levels of parallelism wherein, at a highest level, coarse-grain parallelism (e.g., across accelerators) is achieved via distributed memory computing in accordance with a message passing interface (MPI) standard to, e.g., divide up the total input data set into chunks and partitions that can be operated on in parallel. At a lower level, fine-grain parallelism (e.g., within a single accelerator) divides the work that each accelerator performs on its input partition into kernels to achieve high throughput via vectorization/threading. FIG. 4 is a schematic block diagram of the multi-partitioning logic 400 configured to partition a computational data set of the solver 310 (e.g., mesh 410) into subsets of a domain that are each assigned to a single GPU 280. The solver 310 executes in a single process, multiple data (SPMD) mode with a number of synchronization points during each iteration when data is communicated across the GPUs 280 with "nearest neighbor" (i.e., closest partition having greatest communication bandwidth and lowest latency) partitions or possibly across all GPUs with collective communications. Specifically, the nearest neighbor partitions are partitions sharing a boundary with the current partition's data sets, requiring that the partitions communicate at regular intervals during runtime in order to be able to work independently in between communications.

To reduce the overhead of communications, a graph partitioning approach may be applied to the mesh 410 in order to achieve an even balance in compute load across all GPUs 280 as well as a decrease of edge cuts, where communication is required with each iteration of the solver 310. Given the heterogeneity of the VDC networks for intra-node and inter-node communication (bandwidth and latency), partitioning logic 400 may employ a multi-level (e.g., two-level) graph partitioning scheme that allows for improved results of the partitioning process, e.g., improved nearest neighbor placement, that reduces overall physics solver code execution time. Illustratively, the multi-level partitioning logic 400 partitions an input mesh into smaller and smaller "chunks" over which each kernel process (e.g., MPI rank) executes the same solver control flow and launches the same kernel code. In a first stage, the mesh 410 is partitioned into a number of pieces ("chunks $420_{A-N}$") equal to the number N of total compute nodes $120_N$ involved in the computation ("job"), wherein each compute node may contain multiple GPUs. In a second stage, each chunk $420_{A-N}$ from the first stage assigned to a compute node is then sub-partitioned into a number P of pieces (smaller chunks or "partitions $425_{A-P}$") equal to the number P of GPUs $280_{A-P}$ local to that node. The resulting partitioning improves overall performance of communications by reducing the communication requirements (edge cuts) over slower inter-node network fabrics, thus, reducing solver execution time.

The simulation kernels are then mapped to capabilities of the heterogeneous networks provided by the cloud deployment (VDC) by automatically, i.e., on-the-fly and without human involvement according to constraint optimization, analyzing (i) the available bandwidth of the networks, (ii) the latency between any pair of GPU nodes, and (iii) CPU-GPU memory transfer/bandwidth as constraints with respect to the mesh and the physics being solved (data set). The resulting simulation kernels and partitions $425_{A-P}$ are configured to run on multiple GPUs $280_{A-P}$ in a manner that efficiently utilizes communication/bandwidth between the GPUs (and CPUs) and reduces overhead to enable fast solver execution.

Notably, algorithms and data structures of the simulation kernels may be vectorized and implemented to optimize (concurrent) execution on pipelines of each GPU 280. Such optimized execution enables fast and accurate supercomputer-class performance and realism and, as a result, enables execution of numerous (including transient) simulations that provide solutions at multiple time steps over long time periods, which results in creation of substantial amounts of data. In addition, partitioning of the input data set and parallelization of the kernels may be applied to different classes of physical simulation (e.g., different classes of partial differential equations) across different problems/areas efficiently executing across the dynamic pool of GPUs 280, as well as to multi-physics simulations that may combine physical solvers into a single simulation (e.g., fluid flow+heat transfer+structural analysis+radiation+multiphase flows+aeroacoustics+partial differential integral equations, or any subset of thereof). In effect, the framework 300 operates to re-architect an initial wasteful manner in which memory/data is presented from CPU 270 to GPU 280, into a bandwidth and latency efficient manner which results in, e.g., decreasing register pressure that maximizes bandwidth utilization, as well as re-ordering of loops to run over the GPUs to reduce unnecessary bandwidth consumption.

Figure 5:
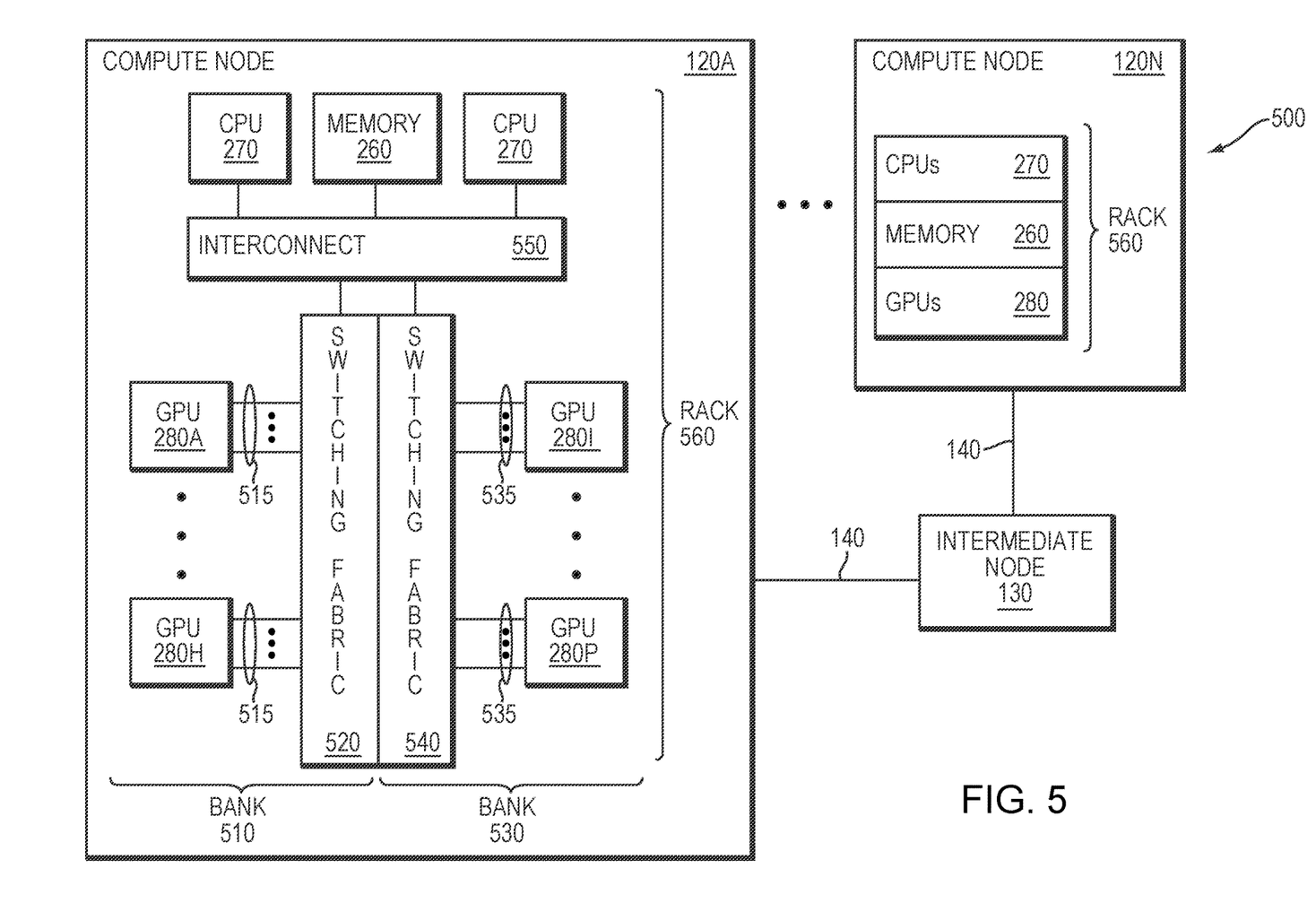
FIG. 5 is a schematic block diagram of a heterogeneous network topology interconnecting compute nodes of the virtual data center.

In an alternate embodiment, the multi-partitioning logic 400 may employ network-aware partitioning strategies to allow movement of the partitions (and associated kernels) or dynamic repartitioning based on runtime estimates of bandwidth and latency for both intra- and inter-node communications. Such strategies may be implemented by a partitioning algorithm of the logic 400 through knowledge of (i) configuration and organization of the GPUs 280 and (ii) underlying topologies and performance of the heterogeneous networks deployed in the VDC 200. FIG. 5 is a schematic block diagram of a heterogeneous network topology 500 interconnecting compute nodes of VDC 200 that may be advantageously used with the cloud-based framework 300. The compute nodes $120_{A-N}$ may be deployed as one or more racks 560 of processor (CPU 270 and GPU 280) resources and memory resources 260 coupled by a local interconnect 550. The nodes $120_{A-N}$ involved with a particular job may be deployed in the same rack, different racks in the same location (e.g., building), or different racks in different buildings. In some deployments, the nodes $120_{A-N}$ may be in different racks in different geographic areas of a region and connected via network segments 140 coupled to one or more intermediate nodes 130. The networks (e.g., interconnects 550 and segments 140) involved with such deployments may be different and diverse with respect to topologies and performance characteristics, e.g., bandwidth and latency, which may impact the network-aware partitioning strategy.

Moreover, the configuration and organization of GPUs 280 on each compute node 120 may also impact the partitioning strategy. For example, each node $120_{A-N}$ of VDC 200 may be configured and organized as a plurality of (e.g., 2) banks 510, 530 of GPUs $280_{A-P}$, wherein bank 510 includes $GPUs_{A-H}$ coupled to a high-speed switching fabric 520 via a plurality of high-speed links 515, and bank 530 includes $GPUs_{I-P}$ coupled to a high-speed switching fabric 540 via a plurality of high-speed links 535. Illustratively, the network-aware partitioning strategy may consider the characteristics of all of these heterogeneous networks (e.g., switching fabrics 520, 540 and links 515, 535, as well as interconnects 550 and segments 140) to maintain synchronization and communication alignment among the GPUs to ensure, e.g., proper scaling. For instance, by reducing interactions between GPUs 280 across nodes 120 (e.g., over relatively slow, low bandwidth network interconnects 550 and segments 140) and increasing GPU interaction within a node 120 (e.g., over relatively fast, high bandwidth links 515, 535 and switching fabrics 520, 540), synchronization and communication alignment among the GPUs 280 may be enhanced to improve performance.

Balancing of the load on each GPU 280 to achieve high parallel efficiency may involve a combination of factors such as balancing a number of control volumes (CVs) and faces of those CVs by the partitioning algorithm and configuring each GPU to achieve similar throughput. In particular, significant enhancement to ordering of faces/CVs local to each node 120 may be realized in accordance with the partitioning strategy to further improve performance. For example to ensure a well-balanced GPU load, all chunks 420 may be configured with similar memory-access patterns by (i) ordering CVs using, e.g., a version of the reverse Cuthill-McKee algorithm, (ii) sorting faces in ascending order of their first CV (each face is shared by two CVs), and notably (iii) sorting, in ascending order of neighboring CV, adjacency matrices for each CV, i.e., lists of neighboring CVs and faces. Reordering of the CVs and neighbor lists may further increase coalescing of memory reads for CV loops. This strategy allows good memory-coalescing, which is an essential aspect of extracting high performance from the GPUs 280.

Illustratively, the framework 300 is directed to optimizing a bottleneck in modern GPUs for simulation kernels: memory bandwidth utilization. These optimizations may include lowering the precision of large portions of the solver intermediates when such lowered precision leads to similar simulation fidelity though use of, e.g., single-precision Jacobian entries (and potentially further block compression: n-bits per block entry with a m-bit multiplier per block or per matrix or per row). Use of modified structure-of-array (SoA) data structure constructs to format and arrange CV data access may allow for coalesced reads, while single aligned allocation for contiguous allocation may be employed so that, e.g., only one pointer and a stride is needed for address calculation of any value. In addition, processing flux fields across CV faces by looping over CVs may minimize reading/writing of redundant CV-wise data and reduce GPU register utilization (and thus the number of registers transferred across a memory bus.) As for the latter, register utilization may be optimized by having smaller kernels which can be easily merged without the need for refactoring and via aggressive reformulation implementing underlying mathematical expressions in code to reduce active intermediate values.

Other optimizations may include approximating a linear system to solve at each step by occasionally skipping computation of new entries for diagonal and/or off-diagonal entries of the Jacobian. In an embodiment, an implementation of a Gauss-Seidel solver may cooperatively handle block-rows of matrix computation across multiple compute lanes, using shared memory for explicit caching and communication. In other embodiments, when a large number of kernels is requested, aggressive fusion of kernels prior to launch in GPUs and usage of asynchronous kernel launches may reduce GPU kernel launch overhead. Further rearranging of Jacobian block writing code to use vector write operations may also decrease significant overwrite of data. Also, intentionally re-computing even moderately complicated calculations can result in higher performance if it results in fewer memory reads, and the kernel is bandwidth-bound. Moreover, compression of solver data (e.g., using lower-precision data formats) may also increase (i) the maximum number of CVs per GPU, which lowers expected network communication overhead according to the multi-level partitioning, and (ii) the performance of the computational kernels, as they are almost all bandwidth-bound. Therefore, calculations to decompress do not affect overall runtime, but the lower memory cost of compressed data save bandwidth and thus time.

Cloud-Based Infrastructure

The framework 300 is configured to cost effectively obtain, use and release resources of the VDC 200 to essentially provide those resources on-demand for the simulation, while avoiding idling of those resources from poor prospective management of expected demand. To that end, the predictive scheduler 600 is configured to locate and predictively reserve resources, including compute (GPU and CPU), memory and storage resources, within the VDC that are available in their respective distributed pools. Those resources may then be dynamically accessed and utilized from the pools when needed, and then promptly released upon completion of the calculations 350 when anticipated demand falls. The accessed (and acquired) resources, such as GPUs and CPUs, may then cooperate to enable processing of the solver 310 and, in particular, the simulation kernels. Access to the resources, such as GPUs 280, within the cloud-based resource pool environment may be contentious because of limited availability and high demand of the GPUs; therefore, the scheduler 600 is configured to be opportunistic with respect to discovering (e.g., constantly scanning for available resources in the pools), predictively assessing resource need, reserving, and then quickly accessing the GPUs on-demand. Utilization of the acquired GPUs is scheduled in a timely manner that synchronizes with required processing of the solver 310 (kernels and partitions 425) so that, upon completion of processing, the GPUs may be promptly released to effectively manage costs for users of CAE SaaS, thereby resulting in a substantial competitive advantage.

Figure 6:
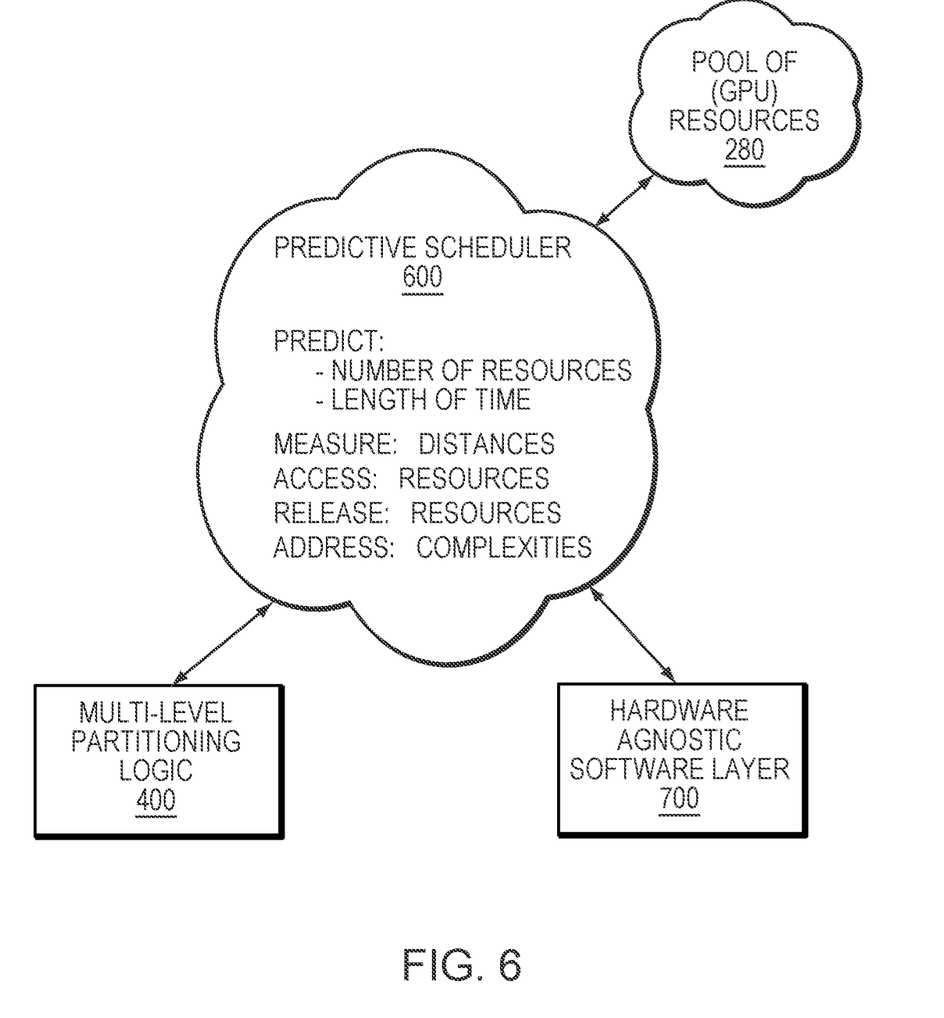
FIG. 6 is a schematic block diagram of a predictive scheduler of the cloud-based framework.

FIG. 6 is a schematic block diagram of the predictive scheduler 600 of the cloud-based framework 300. In an embodiment, the predictive scheduler 600 may interact with the multi-level partitioning logic 400 to locate, reserve, dynamically access, and thereafter release GPUs 280 needed for running the simulation kernels (and partitions 425.) For example, the scheduler 600 may interact with the partitioning logic 400 to predict the number of compute (e.g., GPU) resources needed for the calculations 350 as well as how long (length of time) those resources are needed based on past performance using, e.g., machine learning algorithms influenced by user actions and preferences. The scheduler 600 may also interact with the pool of GPU resources 280 of the VDC 200 to locate the GPUs before they are needed within an expected window of time. The VDC 200 may include various geographically dispersed regions with available GPU resources 280 that may be accessed within those regions. The predictive scheduler 600 may measure the distances (i.e., latency) between the GPU locations (e.g., at which the software executes) relative to each other, dynamically access and utilize available GPUs for kernel execution (e.g., based on the measured distances), and then promptly release the GPUs, if necessary, back to the pool of GPU resources 280 upon completion of the execution.

Notably, the GPUs are initialized (booted) upon access, which may require a period of time as long as 5-6 minutes during which the GPU resources are unavailable for use, e.g., by an intended user's simulation, thereby resulting in wasted bandwidth and cost. To obviate such waste, the scheduler 600 may leverage machine learning algorithms to perform speculative scheduling to predict when GPU resources utilized by another user's simulation may be released and become available. If appropriate, the scheduler 600 may not release those GPU resources once the other user's simulation completes, but rather may hold the resources so that they may be applied immediately (i.e., immediately available) to the intended user's simulation. That is, GPU resource management may be predictively biased by user according to anticipated near-term use based on prior behavior.

Figure 7:
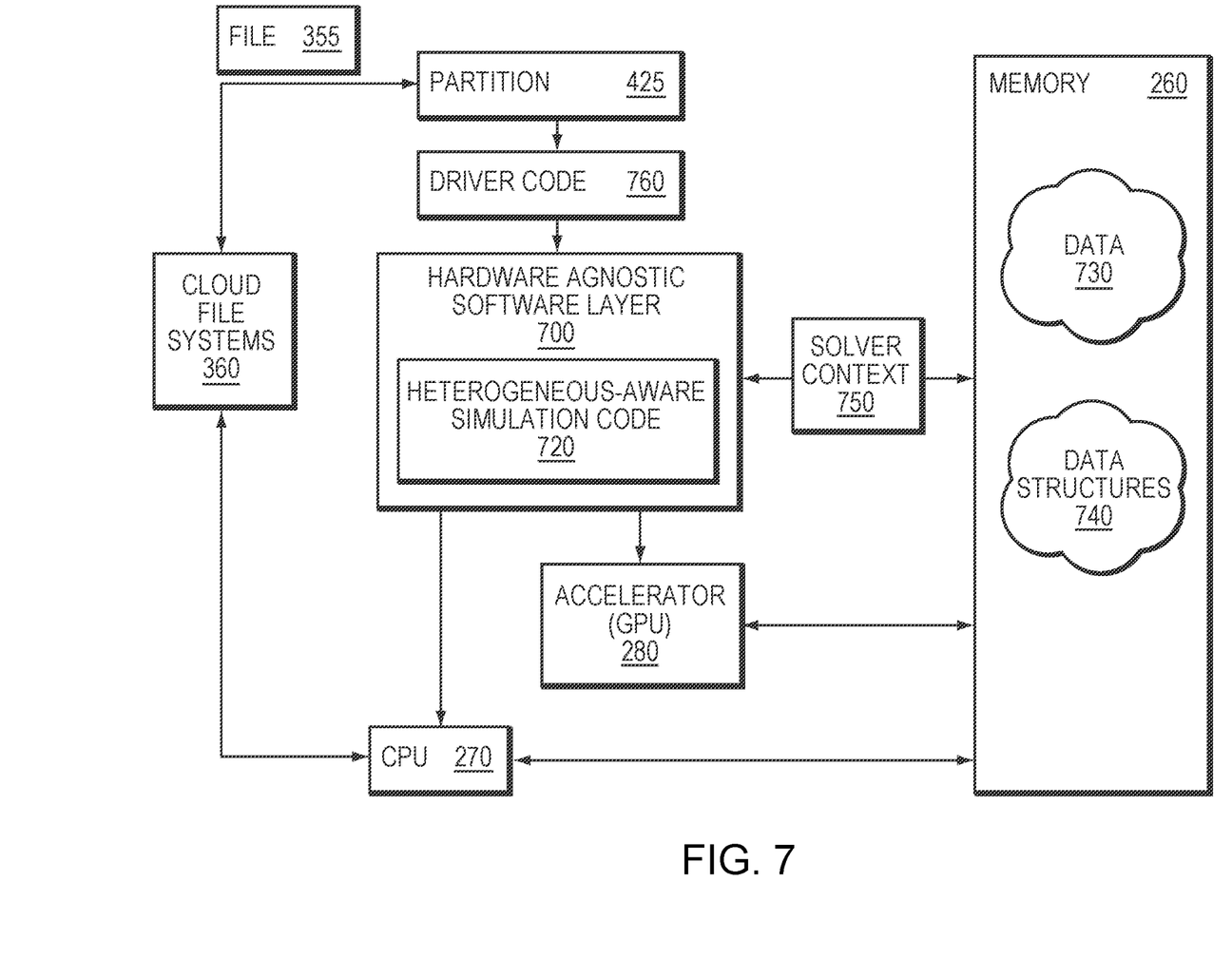
FIG. 7 is a schematic block diagram of a hardware-agnostic software layer of the framework.

The kernels and partitions 425 may run on the GPU 280 and other VDC resources spanning multiple compute nodes 120 within the virtualized computing environment that require management of complexities such as, e.g., partial failure, non-uniform communication latencies and/or non-uniform hardware mixes. The scheduler 600 may further cooperate with the hardware agnostic software layer 700 of the framework 300 to address such complexities through (i) multi-region (i.e., diverse geographic) deployment of VDC resources, (ii) error correction and backup for the parallelized physics solver code calculations, and (iii) resulting simulation data storage and visualization, which is desirable to be constrained near a user location to reduce latency.

Hardware Agnostic Layer and I/O Communication

The framework 300 is also configured to efficiently use bandwidth/compute capacity of the GPUs 280 for solver calculations 350 asynchronously (via "hardware-agnostic" layer 700) and in cooperation with CPUs 270 as needed and on user demand. FIG. 7 is a schematic block diagram of the hardware-agnostic software layer 700 of the framework 300 configured to allow targeting of different accelerator architectures, e.g., GPUs and/or TPUs. Heterogeneous-aware simulation code 720 of the hardware-agnostic software layer 700 dynamically adapts (switches) to new accelerator deployment by, e.g., re-organizing information (data 730 and data structures 740) in memory 260 to run efficiently on the new hardware. In an embodiment, kernel code (e.g., standard C++) of the heterogeneous-aware simulation code 720 computes and stores the outputs of solver calculations 350 by accessing data through a generic interface (solver context 750) that abstracts not only the specific data layout, e.g., structure of arrays (SoA) or array of structures (AoS), but also whether the data is on the CPU host or GPU device. The kernel code is therefore portable and contains valuable physics-specific implementations. Illustratively, the kernels of the solver 310 are written in a hardware-agnostic manner (e.g., a per-element parallelism abstraction suitable for CPUs 270 and GPUs 280) such that they operate at a level of a smallest compute unit (face and/or cell operations) using a fixed interface (hardware independent) for accessing required data, i.e., the solver context 750. These kernels may be executed on existing CPU 270 and GPU 280 architectures using standard programming languages (e.g., C++), and thus are suitable to target different accelerator architectures with minimal modification.

The solver context 750 abstracts away access to quantities stored on a per-face and per-cell basis that are needed to execute the smallest compute units found in the kernel code. In practice, the kernel code with solver context accessors passes through to the specific solver data layout within memory 260 that can be either in CPU host memory or GPU device memory. However, underlying data structures 740 may change over time to provide maximum performance to accommodate developments in hardware architecture designs. As such, the data structures 740 are independent from the interface that accesses them so that memory layouts may be matched to performance requirements of various hardware architectures, or to change data types as needed for applying algorithmic differentiation (AD) including first and higher order Taylor arithmetic to the kernels, without the need to change the kernel code itself.

In order to target different hardware architectures, the kernels are parallelized across many compute units (e.g., multi-threading, vectorization, etc. across sets of faces/cells) using a separate kernel driver code/layer 760 that handles specifics for compiling to the GPU 280 or CPU 270 architecture. The kernel driver code 760 includes control flow of the solver 310 that launches simulation kernels on a particular hardware resource in a prescribed algorithmic order with each iteration (e.g., preprocess data->compute intermediates-> store updated values). The control flow is also hardware agnostic in the sense that (a) it is composed of "cheap" procedural function calls in standard C++ (or any high-level language) and (b) the general order of the steps defined/allowed by the algorithm does not change depending on hardware. The driver code 760 also includes kernel launch code that is responsible for launching kernel code on specific hardware with the partition 425 and current data layout on that partition as input (e.g., either a CPU loop+SIMD vectorization or CUDA kernel launch on GPUs). A corresponding solver context 750 and underlying data layout may further improve the performance of the kernel according to the particular situation. In an embodiment, all available combinations of hardware and context are targeted at compile time before deployment; in an alternative embodiment, a just-in-time (JIT) compiler approach may be used at deployment.

Data 730 (e.g., simulation data) produced by the simulation kernels are stored in large logical constructs (e.g., files 355) containing information about all fields, in all cells in the mesh, for each iteration of the solver 310. This results in very large amounts of data that must be read to process and subsequently visualize into useful information for a user. To that end, the kernels within the solver 310 are configured to natively communicate with cloud file systems 360 by writing (i.e., streaming) results of calculations 350 as files 355, while the solver is running (executing) on a separate set of CPUs/GPUs. Illustratively, the solver 310 exposes the cloud file systems 360 (e.g., distributed object store) using a storage management interface that emulates typical hierarchical file systems to facilitate reading and writing to storage resources 230 (e.g., HDDs and/or SSDs) in parallel.

Note that the solver executes computations on GPUs (e.g., using internal GPU memory) with minimal data movement back to the CPUs, thus permitting performance of I/O asynchronously on idle CPU resources 270 without disturbing the speed of simulation execution on the GPU resources 280 (i.e., without stalling the GPU execution). To accomplish this, background threads on the CPU 270 perform data copy from GPU to CPU (e.g., via memory 260), as well as the file write to cloud file systems 360 asynchronously at regular intervals so as to allow computations to continue on the GPU uninterrupted. This asynchronous I/O technique may be used for writing, e.g., surface solution, volume solution, and summary files containing data computed by the solver on a per iteration basis.

Database and Instant Analysis

Referring again to FIG. 3, the files 355 may include substantial amounts of data that are indexed and organized as output data sets, and that are persistently and asynchronously stored as a query-able database 370, which may be hosted at a cloud file service of the VDC. In one or more embodiments, the data sets are generally organized and stored in formats for recording and retrieving analysis data, such as computational fluid dynamic (CFD), in accordance with the CFD general notation system (CGNS) standard. However, the data sets are designated as immutable once written and are configured to work with a storage system that only supports sequential writes by, e.g., storing the index after the data. In addition, the data sets originate from files 355 that are compressed yet support arbitrary data projection and selection across any number of MPI ranks by, e.g., column-wise splitting of the data set and splitting each column into fixed-size blocks and compressing them independently.

In an embodiment, the names of the files 355 are stored in the database 370. At regular intervals, the solver may communicate directly with the database 370 to update a database entry of an executing simulation (job) by, e.g., reporting status of the job, including the names/locations of any files written containing simulation output data. Illustratively, the database 370 may be presented as an analyzer configured to provide "instant analysis" using text-based queries of a calculated physical simulation result. That is, any amounts of the persistently stored data sets may be subsequently (and instantly) retrieved and displayed for visualization via a graphical user interface (GUI) using text-based queries of the physical simulation, e.g., a CFD result.

The framework 300 enables a multi-pronged approach that allows users to analyze and visualize large data sets interactively. If, prior to or during a simulation, the user specifies the data extraction/visualization desired, the framework extracts the data required for such visualizations (vastly smaller than a full solution) and stores the data in a hierarchical data format (e.g., Hierarchical Data Format 5) for fast access/retrieval, resulting in improved interactivity and reduced data set sizes. Illustratively, such an "in-situ" extraction of information may occur during the running of the simulation (e.g., on the same set of compute resources as the simulation or on a concurrent set of resources) and not after the simulation is completed. However, if the user does not specify a desired visualization prior to/during the running of a simulation, the framework 300 may store the entire output file and visualize whatever the user requests after the simulation has run. Notably, improvements to I/O communication and visualization speed may include parallelization of a visualization pipeline and creation of visualization extracts post-hoc (i.e., after the simulation has run).

Specifically, parallelization (and use of significant resources) of the visualization pipeline may be achieved through various methods such as (i) performing visualization and rendering on GPU 280 (rather than visualization on CPU 270 and rendering on GPU); (ii) creating a storage hierarchy (e.g. Google storage), where files 355 are stored on pools of storage resources 230 (e.g., SSDs) and information from the files may be speculatively loaded into pools of (CPU or GPU) memory resources for visualization/rendering closer to where the information is consumed and/or likely to be used; and (iii) ensuring that the resources used for visualization and rendering can be tailored for low latency response (real-time engineering/visualization) leveraging the flexibility of the VDC 200. Moreover, users can create visualization and analysis templates (e.g., a domain-specific arrangement of slice planes, images and plots) that can be applied to one or more simulation results for the purpose of comparison (i.e., a design exploration) or communication (i.e., easily sharing a curated set of results with other users).

In situations where the user does specify which extractions/visualizations are desired and (smaller) data files do not provide the necessary level of interactivity, additional embodiments may pursue other approaches to enhance analysis. For example, the analysis may be enhanced through pre-rendering of images or scalar images (i.e., images that contain scalar data, depth information, and lighting information that can be re-colored and composed in an interactive fashion). Image data, which is substantially smaller than raw volume data, may be displayed interactively, e.g., as a movie, and the simulation viewed over time. The image data may be used to facilitate filtering of large amounts of time steps or compare the results of ensemble simulations far faster than interacting with large volumetric data.

Advantageously, the framework described herein enables supercomputing-class performance using scaled cloud-based computational resources by optimizing acquisition and utilization of various cloud-based resources (e.g., accelerators) required to process the physical simulation software on-demand as an efficient, cost-effective service based on usage. Such performance is achieved by partitioning the physical simulation software into one or more code groups (simulation kernels operating on one or more partitions) for parallelized and concurrent execution across and/or within the accelerators, as well as providing efficient vectorized algorithms and data structures for the kernels to optimize performance on each accelerator. As a result, the framework provides significant improvement (e.g., 100×) in speed of execution over traditional simulation approaches of legacy vendors executing on conventional multi-processor workstation environments, while effectively managing costs for customers/users of a CAE SaaS offering, thereby resulting in a substantial competitive advantage. In addition, the analyzer is configured to provide an instant analysis service (e.g., for CFD) that allows users of the CAE SaaS to create simulations and extract information very quickly regardless of the size of the data by, e.g., querying one or more persistently stored data sets for a particular calculation of CFD "after the fact."

While there have been shown and described illustrative embodiments of a cloud-based framework configured to dynamically utilize a distributed pool of specialized processing resources to parallelize processing of physical simulation software partitioned across multiple accelerators, it is to be understood that various other adaptations and modifications may be made within the spirit and scope of the embodiments herein. For example, embodiments have been shown and described herein with relation to visual display of data sets using text-based queries, e.g., an arithmetic expression to calculate new fields from existing quantities, by users of the framework. However, the embodiments in their broader sense are not so limited, and may, in fact, allow users to query both individual simulations and large ensembles of simulations using a mathematical/style language that can operate directly on the actual values of the fields stored in each simulation. Design explorations result in a massive amount of data, and each engineering use case is unique. To achieve design goals, the framework enables users to interrogate data (possibly the result of $100s$ of simulations) in general ways through an expression language (e.g., natural language query) that facilitates general queries, e.g., what is the maximum pressure? Where is the minimum value of density? Which simulations have Mach numbers anywhere in the domain that exceed a particular value (e.g., 1.5)? The data may also be interrogated on features that may be extracted from stored fields, e.g., Where is the largest value of vorticity in the domain? What areas of the flow have a gradient of pressure larger than X and the divergence of density is smaller than Y? In addition, derivative information computed by various AD modes of the solver may also be queried, e.g., to speedup training time using machine learning models or optimization.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on hardware resources (node resources) of one or more compute nodes, the program instructions configured to:
partition a data set of a physical simulation solver using graph partitioning into one or more code groups for concurrent execution on one or more accelerator resources of the compute nodes provided by a virtualized data center (VDC) according to a first stage by compute node and a second stage by the accelerator resources of the first stage, wherein the code groups include one or more neare bor partitions of the data set that share a boundary and communic te at intervals;
execute the code groups on predictively reserved accelerator and node resources based on anticipated computational demand of the code groups;
write results of the code group execution to a database hosted at a cloud file service of the VDC; and
provide visualization of the results via a query to a user.

2. The non-transitory computer readable medium of claim 1 wherein the code groups include partitions.

3. The non-transitory computer readable medium of claim 1 wherein the code groups are one of single or multi-physics simulation kernels operating on one or more partitions.

4. The non-transitory computer readable medium of claim 1 wherein the program instructions configured to partition the data set of the physical simulation solver comprises program instructions configured to partition a computational data set of the physical simulation solver into one or more subsets of a domain that are each assigned to one of a node resource or accelerator resource.

5. The non-transitory computer readable medium of claim 4 wherein the computational data set is a mesh.

6. The non-transitory computer readable medium of claim 4 wherein the accelerator resource is a graphics processing unit.

7. The non-transitory computer readable medium of claim 1 wherein the graph partitioning is a multi-level scheme for improved nearest neighbor placement.

8. The non-transitory computer readable medium of claim 7 wherein a nearest neighbor is a closest partition having greatest communication bandwidth and lowest latency.

9. The non-transitory computer readable medium of claim 1 wherein the program instructions configured to write results of the code group execution include program instructions configured to:
write the results of the code group execution as one or more files to the database; and
update a database entry of the file to report a status of the physical simulation solver execution.

10. The non-transitory computer readable medium of claim 1 wherein the program instructions configured to provide visualization of the results include program instructions configured to present the database as an analyzer configured to provide instant analysis using text-based queries of a physical simulation solver result.

11. A method comprising:
partitioning a data set of a physical simulation solver using graph partitioning into one or more code groups for concurrent execution on one or more accelerator resources (resources) of compute nodes provided by a virtualized data center (VDC) according to a first stage by compute node and a second stage by the resources of the first stage, wherein the code groups include one or more nearest neighbor or partitions of the data set that share a boundary and communicate at intervals;
executing the code groups on predictively reserved resources based on anticipated computational demand of the code groups;
writing results of the code group execution to a database hosted at a cloud file service of the VDC; and
providing visualization of the results via a query to a user.

12. The method of claim 11 wherein the code groups include partitions.

13. The method of claim 11 wherein the code groups are one of single or multi-physics simulation kernels operating on one or more partitions.

14. The method of claim 11 wherein partitioning the data set of the physical simulation solver further comprises partitioning a computational data set of the physical simulation solver into one or more subsets of a domain that are each assigned to a resource.

15. The method of claim 14 wherein the computational data set is a mesh.

16. The method of claim 14 wherein the resource is a graphics processing unit.

17. The method of claim 11 wherein graph partitioning is a multi-level scheme for improved nearest neighbor placement.

18. The method of claim 11 wherein writing results of the code group execution further comprises:
writing the results of the code group execution as one or more files to the database; and
updating a database entry of the file to report a status of the physical simulation solver execution.

19. The method of claim 11 wherein providing visualization of the results further comprises presenting the database as an analyzer configured to provide instant analysis using text-based queries of a physical simulation solver result.

20. A system comprising:
one or more compute nodes of a virtualized data center (VDC) having processing circuitry configured to execute a cloud-based framework to dynamically utilize a distributed pool of hardware accelerator resources (resources) provided by the VDC, the cloud-based framework configured to,
partition a data set of a physical simulation solver using graph partitioning into one or more code groups for concurrent execution on one or more of the resources according to a first stage by compute node and a second stage by the resources of the first stage, wherein the code groups include one or re st neighbor partitions of the data set that share a boundary and communicate at intervals;
execute the code groups on predictively reserved resources based on anticipated computational demand of the code groups;
write results of the code group execution to a database hosted at a cloud file service of the VDC; and
provide visualization of the results via a query to a user.

* * * * *